UNITED STATES PATENT OFFICE.

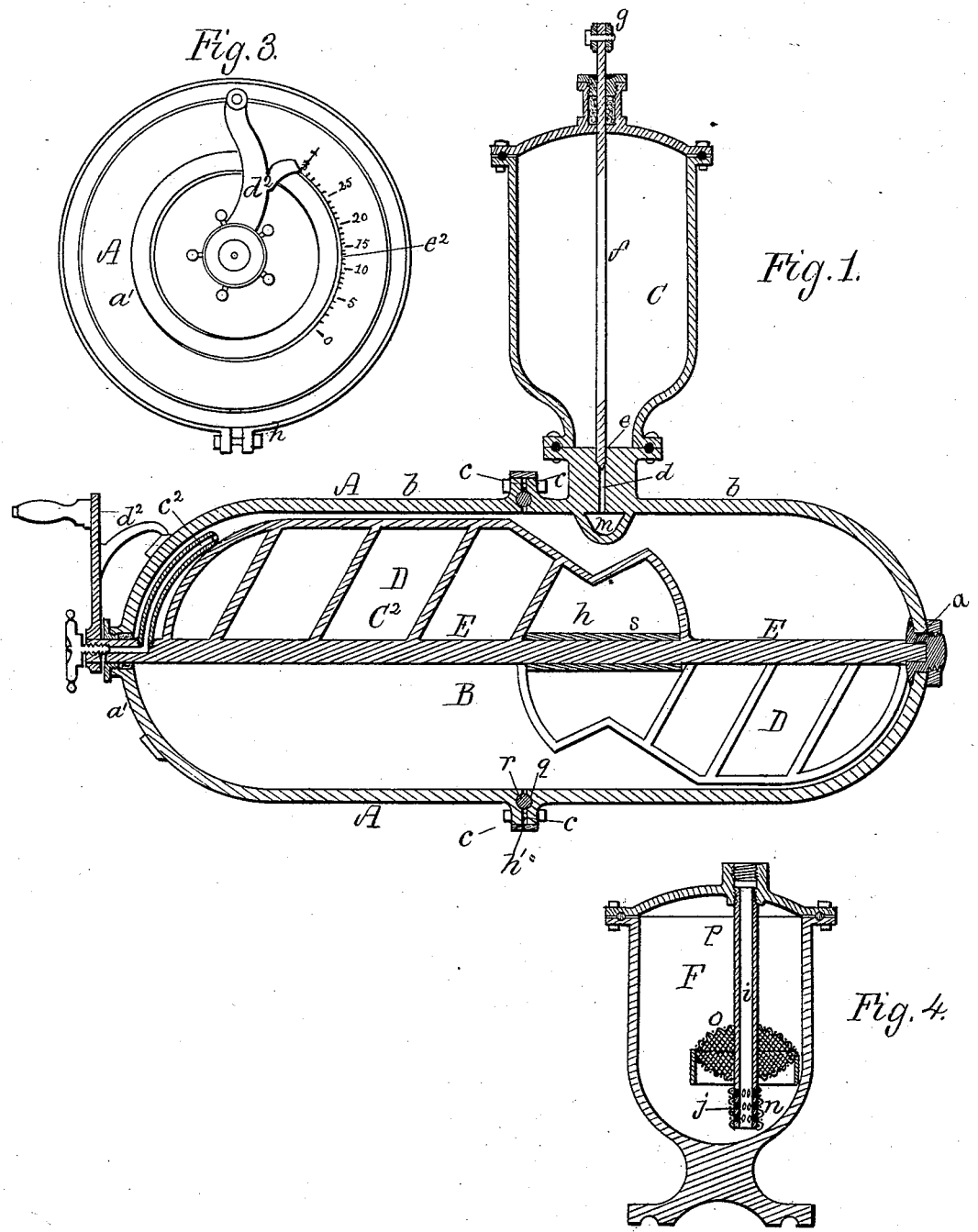

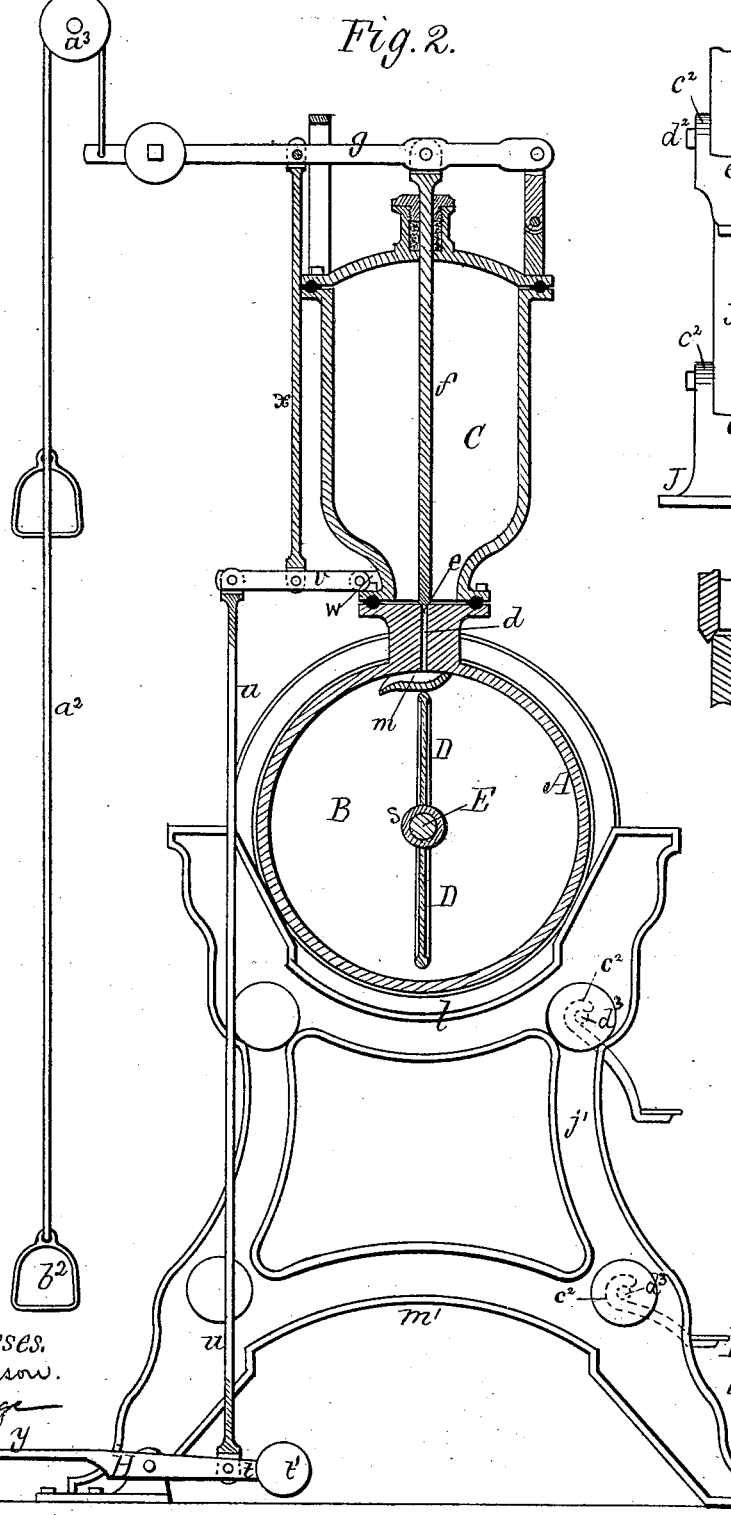

ALVIN D. PUFFER AND ALVIN D. PUFFER, JR., OF MEDFORD, MASS.

GENERATOR.

SPECIFICATION forming part of Letters Patent No. 254,371, dated February 28, 1882.

Application filed November 3, 1881. (No model.)

*To all whom it may concern:*

Be it known that we, ALVIN D. PUFFER and ALVIN D. PUFFER, Jr., citizens of the United States, residing at Medford, in the county of Middlesex and State of Massachusetts, have invented certain new and useful Improvements in Generators for Soda and other Aerated Waters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to generators for producing carbonic-acid gas wherewith to aerate soda-water and other mineral waters.

The said invention consists in the following improvements: first, in combination with an acid-pot and a generator, a chute or guide which receives the acid from said pot and directs it to one side or both sides of the agitator-shaft; second, in combination with a purifier and its perforated supply-pipe, a foraminous screen or strainer through which the gas passes on issuing from said pipe; third, a supplemental strainer, in combination with the purifier and its supply-pipe, said strainer being arranged to intercept the gas as it rises from the perforations in said pipe, and to further subdivide the same; fourth, in combination with a generator and its agitator-shaft, an anti-corrosive jacket or tube enveloping that part of said shaft which is most exposed to the action of acid; fifth, in combination with the acid-pot, its valve, and suitable connections, a weighted lever operating said valve, and a pedal operating said lever in opposition to said weight, substantially as set forth; sixth, in combination with a generator or generating-cylinder having a circular scale representing gallons marked on one end, an agitator-shaft which is made tubular for a part of its length, a curved pipe communicating with the bore of said shaft and carried thereby within said cylinder, and an index or pointer carried by the protruding end of said shaft over the aforesaid scale; seventh, a generator composed of two sections flanged at their joint, one flange being grooved and the other flat and roughened, in combination with a ring of elastic packing which sets between said flanges, substantially as set forth; eighth, in the combination, with the frame or stand which upholds the generator or fountain, of two or more steps adapted to be secured to one of the end standards of such frame, and arranged spirally with respect to each other, in order that one may not be obstructed by the one next above it, these steps being to enable the attendant to get ready access to the upper portion of the fountain or generator, or the portions of the apparatus located above the latter.

In the accompanying drawings, Figure 1 represents a vertical longitudinal section taken through a generator embodying my invention, the frame thereof having been removed. Fig. 2 represents a vertical transverse section through the same, showing a part of the frame and other attachments. Fig. 3 represents an end view of the cylinder of the generator. Fig. 4 represents a vertical section of the purifying-chamber detached. Figs. 5 and 6 are additional detail views of parts of my mechanism.

Referring to the above-named drawings, A represents a generator or fountain of the general form or outline now usually employed by manufacturers of soda and other aerated waters for producing carbonic-acid gas, such generator being a straight horizontal cylinder, B, with semi-spherical ends or heads $a$ $a'$, and formed in halves $b$ $b$, united at the center of the generator by bolts passing through flanges $c$ $c$, cast upon the abutting ends of the said halves, the interior of this generator, as well as of all its parts and connections accessible to the acid employed, being constructed of or lined or protected with lead or other material which resists the corrosive action of the acid.

The receiver or "pot" for containing the acid (sulphuric if carbonic-acid gas is to be generated) is shown in the drawings at C as closed at top and as erected upon the top of the generator A, the lower end or outlet, $d$, of this pot being closed by a conical valve, $e$, closing downward upon its seat, and having a vertical stem, $f$, rising upward through the top of the generator and connected with and operated by a horizontal lever, $g$, pivoted to the top of said pot.

The generator A contains an agitator composed of two flat barred vanes or wings, D D, secured to and extending radially from a shaft, E, which traverses the generator axially, and is stepped at one end in one head, $a$, of such generator, and at the other protrudes through the opposite head, $a'$, of said generator, or a stuffing-box applied to the latter head. The contiguous ends of the vanes D D, which meet about at the center of the shaft E, are separated by a space, $h$, and it is over this space $h$ that the outlet $d$ of the said pot C is situated.

The purifying-tank of the generator is shown at F as an upright vessel adapted to contain water, closed at top and provided with a pipe, $i$, which communicates at one end with the upper part or gas space of the generator, and its other extends to, or about to, the bottom of the vessel F, the lower end of this pipe $i$ being perforated with a series of holes, $j\ j$, &c., to permit of escape of gas entering it under pressure from the generator.

The stand or frame for supporting the generator is composed of two upright end standards united by horizontal rods or bars, these standards being usually forked at top with a flaring opening, $l$, to receive a generator and prevent lateral rolling or misplacement of the latter. One of said standards is shown in Fig. 6, and marked $j'$.

The above description of the construction of a generator applies to those heretofore generally in use.

In carrying out our improvements in the order hereinbefore premised we proceed as follows:

First, to the upper part of the interior of the wall of the generator, and immediately below the outlet $d$ of the acid-tank, I secure a chute, guide, or trough, $m$, so constructed and arranged as to receive the acid precipitated from the pot when the valve $d$ is opened and divert this acid to one side of the shaft E of the agitator $C^2$, in order to protect such shaft from the direct contact of the acid and compel such acid to thoroughly mix with the water in the generator before getting access to the shaft. This guide or chute may be open at one or both ends to direct the acid to one or both sides of the shaft E, and may be of any suitable shape to effect this purpose. We do not restrict ourselves to any arbitrary form of the chute so long as it performs the functions required of it. It is true the shaft E is submerged in water; but owing to the great specific gravity and other characteristics of vitriol (which is the acid usually employed) the stream of the latter precipitated into the generator from the tank or pot C descends rapidly through the water to the lower part of the generator; hence if it were not directed as stated it would impinge directly against the shaft E.

We surround or envelop the lower foraminous end of the pipe $i$ in the purifier F by a finely-reticulated or foraminous screen or strainer, $n$, which serves to subdivide the globules of gas escaping through the openings $j$ in the pipe, and in so doing more effectually extract from the gas impurities contained in it, while to aid still further in effecting this cleansing of the gas we add to the exterior of the said pipe $i$, above the openings $j$, one or more finely-reticulated or foraminous screens or sieves, $o$, through which the small globules of gas passing the screen $n$ are compelled to pass before rising to the gas space $p$ in the upper part of said receiver F.

The flanges $c$ hold between them a packing-ring, $r$, which sets into and more than fills a groove, $q$, in one of said flanges or corresponding grooves, $q$, in both of them. Fig. 6 shows the former construction, one of the flanges being provided with a groove and the other with a roughened surface to hold said packing-ring in place. This improvement effectually prevents the dislodgment of said ring by internal pressure, and also renders unnecessary the screwing together of the generator-sections so tightly as to injure or endanger the flanges. Another advantage of this form of packing is that it is not necessary to screw the flanges together with as much force as if an ordinary packing is used. Heretofore it has often happened that the flanges became broken by the great strain exerted in screwing them together to obtain a tight joint. With my packing this will not occur. The pressure upon the packing-ring by the pressure from within the fountain tends to crowd the said ring against the outer walls of the groove, thus making the joint self-packing to a certain extent after the flanges are bolted together.

A modified form of this packing is shown in Fig. 6 of the drawings, in which one flange is, as usual, in my method, composed of the semicircular groove and the other side a roughened or corrugated surface with the elastic packing between.

We envelop the portion of the agitator-shaft E between the vanes D D by a jacket or tube, $s$, of lead, gutta-percha, or other material capable of resisting the corrosive action of the acid from the pot C. This jacket becomes useful and valuable, more especially in instances where the acid descends directly from the pot C upon the shaft, and is not diverted to one side of the latter.

In one form in which the desired result may be attained we proceed as follows: To the floor of the apartment containing the generator, or to any suitable foundation, we pivot an ordinary pedal, H; the rear or free end, $t$, is preferably weighted, as shown at $t'$, (though this weight may be used or not, as occasion requires,) and is pivoted to the lower end of a rigid upright pitman, $u$, which extends upward alongside the generator A, and at its upper end is pivoted to one end of a horizontal bar or lever, $v$, the inner end of which is in turn pivoted to the top of the generator immediately adjacent to the bottom of the pot C, or to the pot itself, as shown at $w$. The lever $v$ is pivoted near its center to the lower end of a second upright rigid pitman, $x$, the upper end of this pitman being pivoted to the center, or thereabout, of the lever $g$, before named as mounted upon the top of the tank or pot C and operating the outlet-valve $e$ of such pot.

When it is desired to admit into the generator a charge of acid from the pot C the attendant places his foot upon and depresses the foot-rest $y$ of the pedal H, and in so doing effects, through the functions of the pitmen $u$ $x$ and levers $v$ and $g$, a raising of the valve $e$, thereby permitting acid to flow from the pot to the generator, and this pressure upon the pedal is maintained until the desired quantity of acid has been admitted to said generator, when the pressure is removed and the valve allowed to close automatically by the gravity of the weight $z$ of the lever $g$.

By means of the pedal H, connected with the lever $g$, as stated, the attendant is enabled to open and hold open the valve $e$ with much less labor and fatigue than if compelled to raise and hold it open from a comparatively high point by the direct power of his hands and arms, as has heretofore been the practice.

An equivalent for the pedal and its connections to operate the lever $g$ would be to employ a cord or chain, $a^2$, connected at one end with the outer end of the lever $g$ and passing upward about a sheave, $a^3$, thence descending to a point readily accessible to the foot of the attendant, and provided with a stirrup, $b^2$, to receive his foot; or the cord or chain $a^2$ may be shorter and the stirrup remain at a height to be readily grasped by the hand of the attendant and pulled down to open the valve $e$.

We form part of the shaft E with an axial bore, closed at the rear end and open at the front, and we secure to the central portion of such shaft one end of a curved tube, $c^2$, this tube communicating with the interior of the shaft, and its outer end terminating in close proximity to the interior periphery of the generator A, the whole being so arranged that the tube, when lowered by the rotation of the shaft until its outer end or mark reaches the level of the fluid in said generator, shall permit of flow of such liquid into the tube and into and so as to escape from the front end of the shaft E. The said shaft E is to be provided with suitable valve for closing its bore against communication with the generator through the pipe $c^2$. Moreover, we secure to the front end of the shaft E, outside of the head $a'$ of the generator, a radial hand or pointer, $d^2$, which stands parallel with the pipe $c^2$. This construction of the shaft E, tube $c^2$, and pointer $d^2$ does not constitute in itself a part of our present improvements, but is shown and described in a former application for a patent filed by one of us—viz., Alvin D. Puffer—and allowed, and being to ascertain the height of liquid in the generator.

The novel feature in the use of the shaft, pipe, and pointer, as explained, is the combination of them with a circular scale of divisions upon the front of the generator A, as shown at $e^2$ in Fig. 3 of the accompanying drawings, with which the pointer $d^2$ operates. This scale of divisions is to represent gallons or gallons and fractions, and is to be calculated proportionately to correspond with the changing area of the generator at different heights, and is to be so situated with respect to the pointer that when the generator contains, say, ten gallons, the division representing this quantity shall coincide with the pointer, and so on.

The operation of the tubular shaft E, pipe $c^2$, pointer $d^2$, and scale $e^2$ is as follows: When it is desired to ascertain the quantity of liquid in the generator the shaft E, by means of a crank secured to its extremity, is rotated cautiously (the valve governing its bore being previously opened) until liquid from the generator begins to escape from the outer end of the pipe, thus notifying the attendant that the mouth of the pipe $c^2$ has reached the level of the liquid in the generator, when the valve is closed to prevent further waste. The division upon the scale $e^2$ coinciding with the pointer gives the contents of the generator.

We form each end standard, $j'$, at both its ends with a flaring forked opening, $l$ or $m'$, to receive the periphery of the generator, the two standards by means of these openings serving to securely hold the generator and prevent rolling or lateral misplacement of it.

It will be seen that each end of a standard, $j'$, is adapted to receive the generator, and to make the standards interchangeable with various sizes of generators we form the flaring ends of different capacities or sizes, as shown in Fig. 2 of the accompanying drawings.

When the upper ends of the standards are supporting a generator the lower ends constitute the support upon the floor, and as each flaring opening or fork $l'$ or $m'$ may be adapted to receive two sizes of generators, it will be seen that we are enabled to greatly reduce the number of different-sized horses required, thereby economizing space in a manufacturing establishment and reducing the amount of capital essential to manufacture and keep such articles on exhibition.

We employ a thin flat band, $h'$, of metal or other material, which shall present a neat appearance, and we pass this band about the joint between the flanges $c$ $c$, as well as the flanges themselves, thereby concealing what would otherwise present a comparatively unsightly appearance, and imparting an air of neatness and finish to this part of the apparatus.

The ends of the band $n'$ are to be confined together in any suitable manner; but we prefer to form an ear upon each end and clamp these ends together by bolts or screws.

J J in Fig. 5 of the accompanying drawings represent steps, preferably of metal, secured to one side bar of one of the end standards, $j'$, of the frame, which supports the generator or fountain, these steps being bolted permanently to the standard, or being readily removable therefrom as may be desired. In the present instance we have shown the steps as formed at their upper parts with hooks $c^2\ c^2$ to take hold upon horizontal studs $d^2\ d^2$ projecting from the opposite sides of the said standard, as shown in Figs. 2 and 5 of the drawings. the latter figure being an edge elevation of the steps and standard. A portion, $e^2$, of the shank of each step bears upon the outer edge of the standard to afford a firm support, and the steps are arranged, as shown in said Fig. 5, spirally of or upon alternately-opposite sides of the standard, in order that one step may not be obstructed by the one immediately above it. By simply elevating the step until its hook $c^2$ is removed from connection with the stud $d^2$ the entire step may be removed.

In Fig. 2 two steps, T T', are shown, which are arranged at different heights and in different vertical planes, so as to be out of the way of one another, while enabling the attendant to get access readily to the upper portion of the generator, or the portions of the apparatus located above the same. These steps are attached to one of the standards of the supporting-frame by means of hooked arms $c^2$, which catch upon pins or studs $d^3$, extending laterally from said standard.

We claim—

1. In combination with an acid-pot and a generator, a chute or guide, $m$, which receives the acid from said pot and directs it to one side or both sides of the agitator-shaft.

2. In combination with a purifier and its perforated supply-pipe, a foraminous screen or strainer through which the gas passes on issuing from said pipe.

3. A supplemental strainer, $o$, in combination with the purifier and its supply-pipe, said strainer being arranged to intercept the gas as it rises from the perforations in said pipe, and to further subdivide the same.

4. In combination with a generator and its agitator-shaft, an anti-corrosive jacket or tube enveloping that part of said shaft which is most exposed to the action of acid.

5. In combination with the acid-pot, its valve, and suitable connections, a weighted lever operating said valve and a pedal operating said lever in opposition to said weight, substantially as set forth.

6. In combination with a generator or generating-cylinder having a circular scale representing gallons marked on one end, an agitator-shaft which is made tubular for a part of its length, a curved pipe communicating with the bore of said shaft and carried thereby within said cylinder, and an index or pointer carried by the protruding end of said shaft over the aforesaid scale.

7. A generator composed of two sections, flanged at their joint, one flange being grooved and the other flat and roughened, in combination with a ring of elastic packing which sets between said flanges, substantially as set forth.

8. In combination with a generator and its supporting-frame, a pair of steps arranged obliquely one above another, and provided with arms, whereby they are attached to pins or studs on said frame, substantially as set forth.

In testimony whereof we affix our signatures in presence of two witnesses.

ALVIN D. PUFFER.
ALVIN D. PUFFER, Jr.

Witnesses:
H. E. LODGE,
F. G. SIMPSON.